United States Patent Office 3,322,088
Patented May 30, 1967

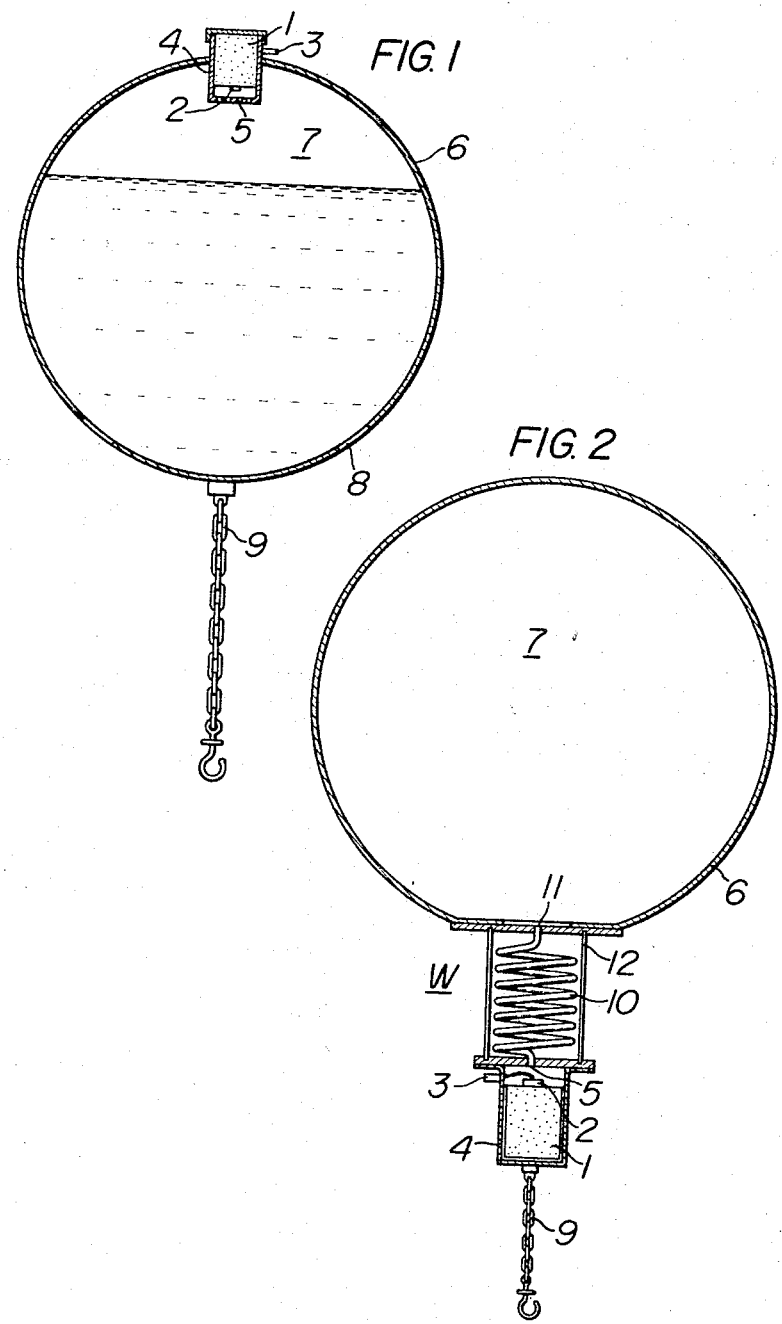

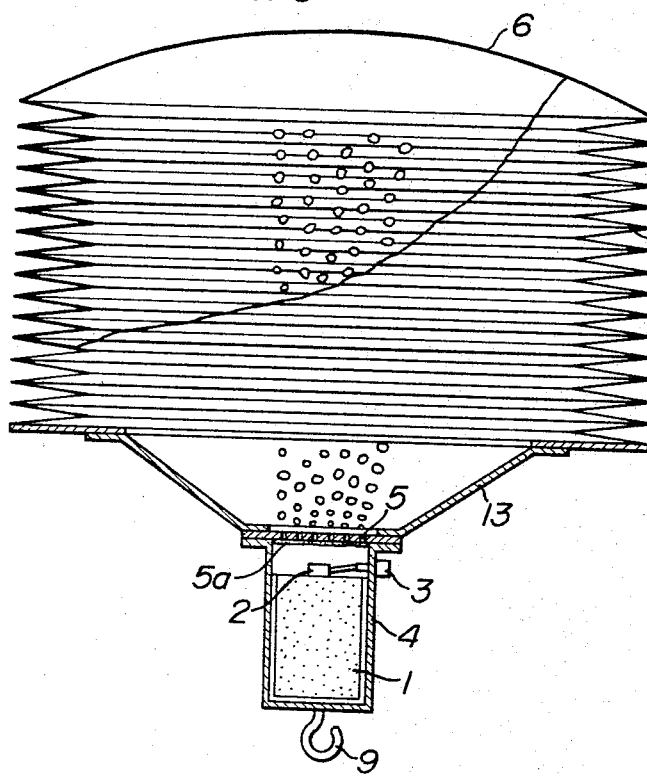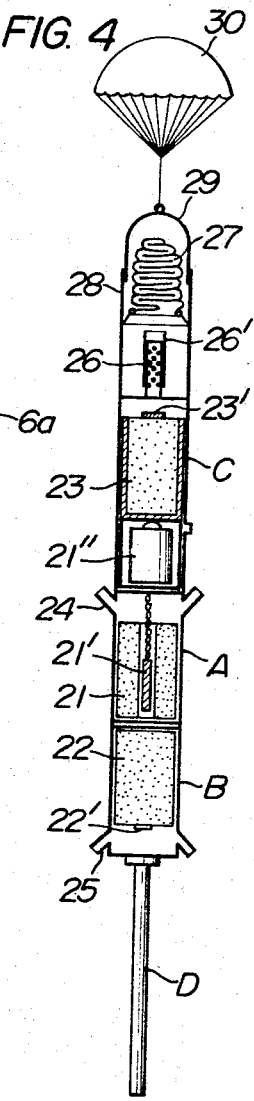

3,322,088
APPARATUS FOR REFLOATING SUBMERGED BODIES
Ikuo Harada, Tokorozawa-shi, and Takeshi Ishimoto, Oita-ken, Japan, assignors to Asahi Kasei Kogyo Kabushiki Kaisha, Osaka, Japan, a corporation of Japan
Filed June 15, 1965, Ser. No. 464,172
Claims priority, application Japan, Nov. 7, 1964, 39/86,339
2 Claims. (Cl. 114—54)

This invention relates to apparatus for refloating submerged bodies and more particularly to a novel apparatus of this kind in which combustion gas generated by the combustion of propellants is collected in a gas vessel to provide required buoyancy to refloat a submerged body.

It is an object of the present invention to provide a novel refloating apparatus adapted for connection with a sunken ship or freight to make it buoyant by the utilization of buoyancy provided by combustion gas of propellants collected in a gas vessel.

Another object of the present invention is to provide a self-buoyant underwater apparatus which can be integrally coupled to a submersible camera, a rocket type instrument for collecting matter existing at the sea bottom, any other oceanographic surveying instrument or any other underwater instrument for refloating such instrument after the instrument has completed its duty.

A further object of the present invention is to provide a refloating apparatus of the kind described which can be obtained at low cost, can be handled in a simple and easy manner and can safely be operated.

According to the present invention, there is provided an apparatus for refloating a submerged body comprising gas generator means containing propellants therein so as to generate gas by the combustion or pyrolysis of the propellants, a gas vessel for collecting therein the gas generated in said gas generator means, and connecting means for providing connection with the submerged body. The above and other objects, advantages and features of the present invention will become obvious from the following description with reference to the accompanying drawings, in which:

FIG. 1 is a vertical sectional view of an embodiment of the refloating apparatus of the present invention which can conveniently be used for the reflotation of a heavy submerged body;

FIG. 2 is a vertical sectional view of another embodiment of the refloating apparatus of the present invention;

FIG. 3 is a front elevational view, partly in section and cut away, of still another embodiment of the refloating apparatus of the present invention; and FIG. 4 is a vertical sectional view of a self-buoyant underwater apparatus comprising the combination of an underwater measuring instrument and the refloating apparatus according to the present invention.

At first an outline of principal components of the apparatus embodying the present invention will be described. According to the present invention, the buoyancy generating section which is common to all of the embodiments as will be described later comprises (a) a combustion cylinder or gas generator having therein propellants and an igniter; (b) a gas vessel which may be provided with a gas cooler as the case may be; and (c) connecting means for providing connection with a body to be refloated.

The combustion cylinder is a closed pressure vessel having a gas discharge port and contains therein propellants and an igniter means therefor. Combustion of the propellants in the combustion cylinder takes places by the actuation of a switch means associated with a source of current supply. A battery is ordinarily used as the source of current supply and a manual or automatic switch of any known structure may be used as the switch means. The gas discharge port is generally closed watertight by a waterproof plug means to prevent intrusion of water into the combustion cylinder, but the structure is such that the plug means is easily removed from the port by the internal pressure in the combustion cylinder as soon as the combustion takes place. However, the plug means may be dispensed with when the gas vessel is of closed structure.

The propellant and priming material may be any of the so-called composite propellants recently employed for the rocket propulsion or such materials as smokeless powder and black powder which gasify through a chemical reaction commonly called "combustion." It is to be understood that the propellant and priming material employed in the inventive apparatus do not include high explosives such as dynamite which is used for the purpose of blasting operation by so-called "detonation."

The gas vessel employed in the invention is a closed or a semi-closed vessel which is capable of expansion and contraction in its volume and may be made of an organic soft material such as rubber or of a metal in the form, for example, of bellows. In one embodiment of the invention, the gas vessel is a rigid hollow semi-closed vessel. The gas vessel may have any suitable shape, depending on the type of service intended, including a spherical, cylindrical, boat-like and doughnut-like shape.

The connecting means in the inventive apparatus may have any suitable known structure depending on the type of body to be refloated, but may obviously be dispensed with when such connecting means is fitted integrally to a submerged body to be refloated.

The manner of collecting gas in the gas vessel from the combustion cylinder can broadly be classified into two methods, that is, (i) a method for collecting gas in a rigid hollow vessel in a manner to replace water therein by the gas, and (ii) a method for directly collecting gas in an expansible closed vessel. In addition to the above two methods, there may be a case in which a gas cooler is associated with the gas vessel in order to cool the gas being collected into the gas vessel.

In FIG. 1, there is shown one form of the refloating apparatus of this invention. The apparatus of FIG. 1 is of the type in which water is preliminarily suitably filled in a rigid hollow gas vessel of a material such as iron and the pressure of the combustion gas obtained by combustion of the propellant is utilized to force the water out of the gas vessel so that the gas can be collected therein in water replacing relation. As shown in FIG. 1, the refloating apparatus comprises a hollow rigid gas vessel 6 made of iron, and a combustion cylinder or gas generator 4 mounted in watertight relation in the top end of the gas vessel 6. A connecting member 9 consisting of an iron chain and an engaging hook depends from the lower end of the gas vessel 6. An ignition switch 3 is suitably mounted on the combustion cylinder 4 so as to cooperate with an ignition means 2 to cause the combustion of propellant 1 in the cylinder 4. The combustion cylinder 4 has a plurality of gas discharge apertures 5 at its bottom which are normally closed by a waterproof film. The gas vessel 6 is provided with a plurality of communication openings 8 which are normally closed by means such as pressure regulating check valves. Thus the communication openings 8 function to discharge the water preliminarily admitted into the gas vessel 6 and at the same time to discharge an excess of the combustion gas and that portion of the combustion gas which may gain in its volume due to reduced water pressure resulting from the floating movement of the gas vessel so that the acceleration during the floating movement can thereby be maintained constant. The refloating apparatus of FIG. 1 operates in the following manner.

At first, a suitable amount of water is admitted into the rigid hollow gas vessel 6, which is then gravitated to the sea bottom. After the apparatus is connected with a body to be refloated (not shown) by the connecting member 9, the ignition switch 3 is suitably depressed to actuate the ignition means 2 so that combustion of the propellant 1 within the combustion cylinder 4 takes place. The combustion gas, as it gains in its pressure, forces through the waterproof film hermetically sealing the discharge apertures 5 into an air space 7 in the gas vessel 6 and, as the pressure further increases, forces the water within the gas vessel 6 outwardly through the communication openings 8. While forcing the water outwardly, the combustion gas fills within the vessel 6 to generate buoyancy, which is transmitted to the submerged body to be refloated by way of the connecting member 9 so that the submerged body can be refloated by the refloating movement of the refloating apparatus.

Another embodiment of the refloating apparatus of this invention as shown in FIG. 2 is provided with a collapsible or expansible spherical closed gas vessel 6 of soft flexible material such as rubber-coated nylon cloth. A gas cooler 10 is disposed intermediate a combustion cylinder 4 and the gas vessel 6 in order to prevent the gas vessel from melting due to the high temperature of the combustion gas. The gas cooler 10 consists of a cooling coil of copper or the like which opens at one end into the gas vessel 6 as at 11 and at the other end into the combustion cylinder 4 as at 5. A plurality of supports 12 connect the gas vessel 6 with the combustion cylinder 4. The refloating apparatus of FIG. 2 operates in the following manner. Unlike the apparatus of FIG. 1, the apparatus presently described is at first in its collapsed or contracted state and is brought towards the sea bottom in the collapsed state as it generates no buoyancy. After the apparatus is connected with a submerged body (not shown) by a connecting member 9, ignition switch 3 is suitably depressed to actuate ignition means 2 so that combustion of propellant 1 in the combustion cylinder 4 takes place. Combustion gas thereby produced is led through the gas discharge aperture 5, the cooling coil 10 and the entrance aperture 11 into the gas vessel 6 while being suitably cooled by water W surrounding the cooling coil 10 to expand the collapsed gas vessel 6 into a spherical shape as shown by reference numeral 7. Buoyancy thus provided by the expanded gas vessel 6 can sufficiently refloat the submerged body.

Still another embodiment of the refloating apparatus of the present invention as shown in FIG. 3 is provided with a collapsible semi-closed gas vessel 6 of metallic or soft material and is so arranged that combustion gas from a combustion cylinder 4 is directly discharged into water for being cooled by the surrounding water and then collected in the semi-closed vessel 6 through an entrance opening disposed immediately above the combustion cylinder 4. The semi-closed vessel 6 of this embodiment is shown as a bellows 6a of aluminum. The gas vessel 6 is supported on the combustion cylinder 4 by a plurality of supports 13 and the combustion cylinder 4 is provided with a plurality of gas discharge apertures 5 normally closed by a waterproof film 5a of rubber or like material. The refloating apparatus of this embodiment operates in a manner generally similar to the previously described embodiments. After the apparatus is connected with a submerged body (not shown) on the sea bottom by a connecting member 9, ignition switch 3 is suitably depressed to cause combustion of propellant 1 in the combustion cylinder 4. Combustion gas, as it gains in pressure, breaks the waterproof film 5a closing the discharge apertures 5 and enters into water. The combustion gas passes upwardly in the form of bubbles while being suitably cooled by the water and is collected in the semi-closed gas vessel 6 through the opening disposed immediately above the discharge apertures 5. The combustion gas progressively filling the gas vessel 6 causes the vessel 6 to expand and buoyancy can thereby be provided.

In FIG. 4, there is shown a self-buoyant underwater measuring apparatus which is obtained by the combination of a refloating apparatus utilizing the combustion gas of propellant as described above and an underwater measuring instrument. The term "under-water measuring instrument" used herein is intended to include a submersible camera, tidal current meter, thermometer, plankton collector, mud collecting apparatus, terrestrial magnetism meter, and may other known measuring and surveying instruments employed for the oceanographic surveying. The apparatus of FIG 4 differs from the apparatus of FIGS. 1, 2, and 3 in that the former is thrown into sea in a state that the refloating apparatus is preliminarily unitarily coupled to the measuring instrument, whereas the latter are led towards a submerged body and connection therebetween is effected at the sea bottom. It will be understood that the merit of self-buoyancy can thus be derived.

By way of an example of such underwater measuring apparatus, there is shown in FIG. 4 a self-buoyant, ropeless, sea bottom sample collecting apparatus which comprises a rocket type sea-bottom sample collector unitarily coupled to a refloating apparatus as described previously. The apparatus of FIG. 4 consists of a mud collecting member D of tubular shape, a rocket section A for generating thrust for driving the mud collecting member D into the sea bottom, a rocket section B for generating thrust for retracting the mud collecting member D away from the sea bottom, and a refloating section C utilizing the buoyancy provided by combustion of propellant. The rocket sections A and B have therein composite propellants 21 and 22 and ignition means 21' and 22', respectively, and delay means is provided so that combustion of the propellant 22 by the ignition means 22' takes place in 5 seconds after the ignition of the propellant 21 by the ignition means 21' is effected. A plurality of rocket nozzles 24 and 25 are provided at the respective rocket sections A and B at suitable angle with respect to the axis of the apparatus so that a downwardly driving force and rotating power are imparted by the rocket nozzles 24 while an upwardly driving force and rotating power are imparted by the rocket nozzles 25. The mud collecting member D may be of any known structure and may consist of a sample collecting tube of polyvinyl chloride covered by an iron pipe, and a check valve may be mounted at the lower end of the sample collecting tube to prevent a backward flow of the sample mud during the retraction of the mud collecting member D from the sea bottom. The refloating or buoyancy generating section C contains in its lower portion a battery 21" of 12 volts, a suitable amount of composite porpellant 23 and an ignition means 23' which is associated with a delay means so that combustion of the propellant 23 takes place about 30 seconds after the ignition of the propellant 21 by the ignition means 21'. A pressure sensitive switch means 22" is provided to actuate the ignition means 21', 22' and 23' when the apparatus engages the sea bottom. A plurality of gas discharge apertures 26 are provided in the upper portion of the buoyancy generating section C and are normally covered by a waterproof film 26' of material such as rubber to prevent intrusion of water into the propellant 23 through these apertures 26. A collapsible semi-closed gas vessel 27 of material such as rubber-coated nylon cloth having a bottom opening is accommodated in its collapsed state in a cylinder 28 and a cap 29 and is connected to the cylinder 28 by a chain 27' of metallic material. During the downward movement of the apparatus towards the sea bottom, water intrudes into the cylinder 28 so that the discharge apertures 26 are submerged in the water. A parachute 30 is fitted to the top end of the cap 29 in order to cause the apparatus to move towards the sea bottom in its upright posture.

The apparatus of FIG. 4 operates in the following manner. When the apparatus after having been entirely assembled is thrown into sea, the downward movement of the apparatus is restricted by the parachute 30 so that the apparatus gravitates towards the sea bottom in its upright position. As soon as the tip of the mud collecting member D engages the sea bottom, shock imparted to the apparatus actuates the pressure sensitive switch means 22" which in turn places in operation the ignition means 21', 22' and 23' for the respective sections A, B and C. At first the ignition means 21' operates instantaneously to cause the combustion of propellant 21 and a rocket effect resulting from the forcing of the combustion gas through the rocket nozzles 24 generates a downwardly driving force and rotating power so that the mud collecting member D is driven into the sea bottom and a sample of mud is collected therein. 5 seconds thereafter, the delay means causes the ignition means 22' to operate and combustion of the propellant 22 generates an upwardly driving force and rotating power so that the mud collecting member D is pulled out of the sea bottom. About 30 seconds thereafter, the delay means places the ignition means 23' in operation and combustion of the propellant 23 thereby takes place. Combustion gas breaks through the waterproof film 26' and is discharged through the discharge apertures 26 to force the collapsed gas vessel 27 and the cap 29 outwardly. The combustion gas is then collected in the gas vessel 27 through its bottom opening while being cooled by water within the cylinder 28 and the entire apparatus can be refloated to the surface of the sea by the buoyancy generated by the gas collected in the gas vessel.

From the foregoing detailed description it will be understood that an important feature of the present invention is that combustion gas of propellants is utilized to provide buoyancy for the reflotation of submerged weighty bodies, thus eliminating the use of prior refloating means such as wire ropes and compressed air provided by air compressors. Advantages derivable from the invention by virtue of such unique feature include compactness in the structure of the apparatus, low manufacturing cost, excellant mobility, ease of handling and ability to make automatic operation, as will be readily understood.

What is claimed is:

1. An apparatus for refloating a submerged body comprising gas generator means containing propellants therein so as to generate gas by the combustion or pyrolysis of the propellants, a collapsible gas vessel spaced above said gas generator means and having a bottom opening for collecting therethrough the gas generated in said gas generator means, means connecting said gas vessel with said gas generator means in spaced apart relation from each other, and conduit means defining an indirect tortuous path for the flow of gases from the generator means to the gas vessel, said conduit means being in heat exchange relation with the ambient fluid whereby the generated gas can directly be cooled by surrounding water during its upward movement into said gas vessel.

2. An apparatus as claimed in claim 1 wherein said conduit means is a coil.

References Cited
UNITED STATES PATENTS

| | | | |
|---|---|---|---|
| 557,396 | 3/1896 | Kindt | 114—54 |
| 605,231 | 6/1898 | Matignon | 114—54 |
| 3,080,844 | 3/1963 | Lehmann | 114—54 |

MILTON BUCHLER, *Primary Examiner.*

ANDREW H. FARRELL, *Examiner.*